(12) United States Patent
Quere et al.

(10) Patent No.: US 9,648,396 B2
(45) Date of Patent: May 9, 2017

(54) METHOD OF DIGITAL AUDIO/VIDEO CHANNEL CHANGE AND CORRESPONDING APPARATUS

(75) Inventors: Thierry Quere, Cesson Sevigne (FR); Renaud Rigal, Cesson Sevigne (FR)

(73) Assignee: Thomson Licensing DTV, Issy-les-Moulineaux (FR)

( * ) Notice: Subject to any disclaimer, the term of this patent is extended or adjusted under 35 U.S.C. 154(b) by 251 days.

(21) Appl. No.: 13/503,836

(22) PCT Filed: Oct. 26, 2010

(86) PCT No.: PCT/EP2010/066197
§ 371 (c)(1),
(2), (4) Date: Apr. 24, 2012

(87) PCT Pub. No.: WO2011/051303
PCT Pub. Date: May 5, 2011

(65) Prior Publication Data
US 2012/0213295 A1 Aug. 23, 2012

(30) Foreign Application Priority Data
Oct. 30, 2009 (EP) .................................. 09306038

(51) Int. Cl.
| | | |
|---|---|---|
| *H04N 7/26* | (2006.01) | |
| *H04L 12/66* | (2006.01) | |
| *H04N 21/643* | (2011.01) | |
| *H04N 21/433* | (2011.01) | |
| *H04N 21/438* | (2011.01) | |
| *H04N 21/442* | (2011.01) | |
| *H04N 21/61* | (2011.01) | |
| *H04N 21/6377* | (2011.01) | |

(52) U.S. Cl.
CPC ... *H04N 21/64322* (2013.01); *H04N 21/4331* (2013.01); *H04N 21/4384* (2013.01); *H04N 21/44209* (2013.01); *H04N 21/6125* (2013.01); *H04N 21/6175* (2013.01); *H04N 21/6377* (2013.01)

(58) Field of Classification Search
CPC ........... H04N 21/4331; H04N 21/4384; H04N 21/44209; H04N 21/64322; H04N 21/6175; H04N 21/6377; H04N 21/6125
USPC ...................................... 375/240.25
See application file for complete search history.

(56) References Cited

U.S. PATENT DOCUMENTS

| | | | |
|---|---|---|---|
| 2003/0200551 A1 | 10/2003 | Kang | |
| 2004/0218899 A1* | 11/2004 | Oyama et al. | ............... 386/46 |
| 2006/0075428 A1 | 4/2006 | Farmer et al. | |

(Continued)

FOREIGN PATENT DOCUMENTS

| | | |
|---|---|---|
| CN | 1469639 A | 1/2004 |
| CN | 1960453 A | 5/2007 |

(Continued)

*Primary Examiner* — Gims Philippe
*Assistant Examiner* — On S Mung
(74) *Attorney, Agent, or Firm* — Myers Molin, LLC

(57) ABSTRACT

The present invention generally relates to digital communications, and more particularly, to a technique for processing data in a digital communication device so as to reduce channel change times. To this effect, the invention comprises a specific sequencing and arrangement of operations that are required to be executed in the digital communication device during a channel change.

25 Claims, 6 Drawing Sheets

(56) References Cited

U.S. PATENT DOCUMENTS

| | | |
|---|---|---|
| 2006/0117342 A1 | 6/2006 | Park et al. |
| 2007/0044130 A1* | 2/2007 | Skoog .......................... 725/110 |
| 2007/0098005 A1* | 5/2007 | Furlong ............ H04N 21/4384 |
| | | 370/437 |
| 2007/0204320 A1 | 8/2007 | Wu et al. |
| 2007/0266398 A1* | 11/2007 | Vandaele ....................... 725/38 |
| 2008/0109557 A1 | 5/2008 | Joshi et al. |
| 2008/0192839 A1 | 8/2008 | Gahm et al. |
| 2008/0282301 A1 | 11/2008 | Liu et al. |
| 2008/0307457 A1 | 12/2008 | Yang et al. |
| 2008/0320537 A1 | 12/2008 | Rajakarunanayake |
| 2009/0175272 A1 | 7/2009 | Hedaoo et al. |
| 2010/0046632 A1* | 2/2010 | Horn et al. ............... 375/240.25 |
| 2010/0118938 A1* | 5/2010 | Fuchs ................... H04L 65/607 |
| | | 375/240.12 |

FOREIGN PATENT DOCUMENTS

| | | |
|---|---|---|
| CN | 101267537 A | 9/2008 |
| EP | 1 372 338 A1 | 12/2003 |
| EP | 1 675 343 A1 | 6/2006 |
| EP | 1755339 | 2/2007 |
| EP | 1855478 | 11/2007 |
| EP | 1 926 322 A1 | 5/2008 |
| JP | 2007-324814 A | 12/2007 |
| JP | 2008-294663 A | 12/2008 |
| JP | 2009-017064 A | 1/2009 |
| KR | 10-2008-0022816 A | 3/2008 |
| WO | WO2008011899 | 1/2008 |
| WO | 2008/076023 A1 | 6/2008 |
| WO | WO2009041755 | 4/2009 |

* cited by examiner

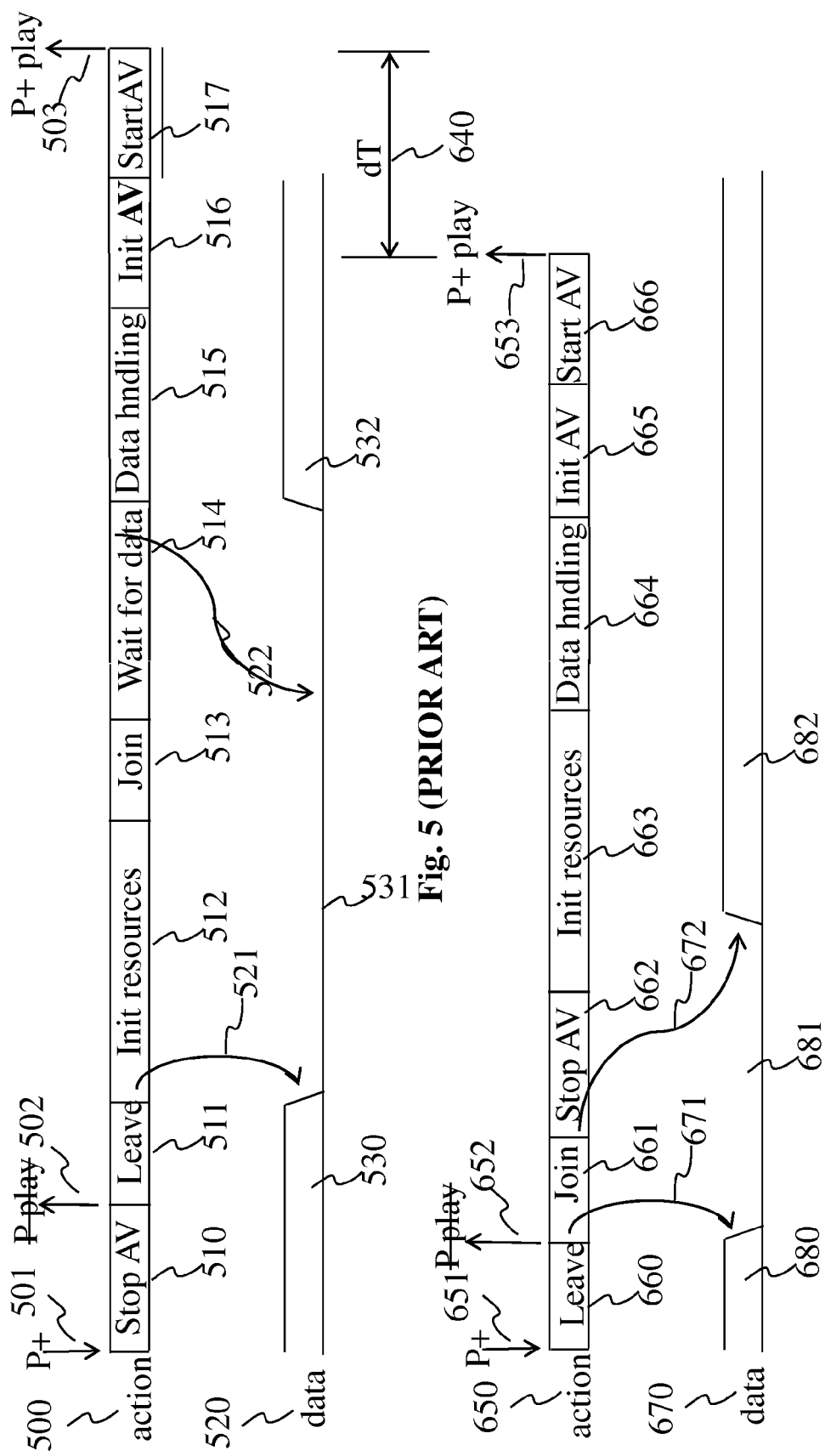

METHOD OF DIGITAL AUDIO/VIDEO CHANNEL CHANGE AND CORRESPONDING APPARATUS

This application claims the benefit, under 35 U.S.C. §365 of International Application PCT/EP2010/066197 filed Oct. 26, 2010, which was published in accordance with PCT Article 21(2) on May 5, 2011 in English and which claims the benefit of European patent application No. 09 306038.2, filed Oct. 30, 2009.

1. FIELD OF INVENTION

The present invention generally relates to digital communications, and more particularly, to a technique for processing data in a digital communication device so as to reduce channel change times.

2. TECHNICAL BACKGROUND

Digital audio/video receivers such as Internet Protocol (IP) digital audio/video receivers (IPTV) are becoming increasingly popular. Unfortunately, channel change times with such receivers are relatively high. One potential cause for such high channel change times in the digital audio/video domain involves the relative complexity of digital audio/video receivers which is ever increasing due new distinguishing features such as time-shift recording of live digital video streams, handling of multicasted or unicasted video streams that are encoded with highly complex video encoding techniques, handling of video stream descrambling and application of error correction methods. With the increasing complexity of digital audio/video receivers many resources must be managed inside such receivers, such as network controllers, hard disks, reception buffers, error correctors, video and audio stream decoders.

Channel changing for an digital audio/video receiver can thus be a rather complex and resource-demanding process: stop of transmission of the current video/audio stream must be requested, internal hard- and/or software resources must be freed, reception of a next video/audio stream must be requested, and internal resources must be set up for the reception of the next video/audio stream; upon reception of the desired video/audio stream video/audio data must be buffered, possibly error correction is applied, possibly data is descrambled, video/audio data must be synchronized, decoded and finally, rendered. Channel change delay is caused by all or some of these operations. In digital audio/video receivers equipped with a time-shift feature based on a hard disk, time-shift offers the possibility to "pause" a live transmission, the channel change delay will be even longer when time-shifting is used, due to relatively slow disk access. As a result of all of these steps, channel change times can become relatively long, which may be unacceptable to users, and thus for digital audio/video providers.

Prior art document US2006075428 describes caching video packets for a most likely next channel in a buffer in a receiver in anticipation of a television subscriber changing channels. These prior art solutions focus on providing decodable I-frames for a next channel as soon as possible in order to reduce the blank period when switching channels. However, prior art techniques are rather complex to implement and have drawbacks of increasing the complexity and thereby the costs of transmitters and receivers.

Accordingly, there is a need for a technique that allows reducing the time necessary to effectuate a channel change operation in digital audio/video receivers in a simple way.

3. SUMMARY OF THE INVENTION

The present invention aims at alleviating some of the inconveniences of prior art.

More precisely, the invention allows reduction of channel change delays in digital audio/video decoders.

Throughout this document, the term audio/video is used or AV, meaning audio or video, and audio and video.

Throughout this document, the term AV stream is used, meaning a stream comprising audio and/or video streams and possibly comprising other data than audio/video streams, such as tables signaling the components of the individual audio/video streams, tables signaling binary or auxiliary data such as interactive applications and subtitles.

In order to reduce channel change delays in digital audio/video receivers, the invention proposes a method of digital audio/video channel change, comprising steps that are executed in an order a, b, c, d, e of a) a step of decoding audio/video data comprised in a first received audio/video stream using an audio/video decoder, b) a step of reception of a channel change request, c) a step of sending of a request to stop receiving the first audio/video stream to a network and a request to start receiving a second audio/video stream, d) a step of stopping of the audio/video decoder, and e) a step of starting of the audio/video decoder to decode audio/video data comprised in the received second audio/video stream.

According to a variant of the method, any audio/video data from the second audio/video stream that is received after the sending of a request to start receiving the second audio/video stream is used as audio/video data comprised in the received second audio/video stream upon the starting of the audio/video decoder. In such a way, any data that is received before the receiver being handle it, is used by the receiver when it is ready to handle the data.

According to a variant of the method, the method comprises a step of determination if a sum of a first bit rate of the first audio/video stream and of a second bit rate of the second audio/video stream is below a determined threshold, and if the sum is below the determined threshold, the request to stop receiving the first audio/video stream is sent after the request to start receiving the second audio/video stream, whereas if said sum is not below the determined threshold, the request to stop receiving the first audio/video stream is sent before the request to start receiving the second audio/video stream.

According to a variant of the method, the bit rate of the first and/or of the bit rate of the second audio/video stream is determined through:

bit rate values obtained from measurements done by a device implementing the method on bit rates of the first and/or said second audio/video streams during previous reception of the streams; and/or bit rate values of the first and the second streams received from a server connected to the device.

According to a variant of the method, the bit rate of the first or of the bit rate of the second audio/video stream is determined from a set of values comprising:

bit rate values obtained from measurements done by the receiver on bit rates of the first and/or the second audio/video streams during previous reception of said streams; and bit rate values of the first and the second streams received from a server connected to said network.

According to a variant of the method, the determined threshold is obtained from:

a preconfigured downlink bandwidth stored in a memory; and/or an estimation of downlink bandwidth obtained through measurement of network traffic.

According to a variant of the method, the determined threshold is obtained from a set of downlink bandwidth values comprising:

a preconfigured downlink bandwidth stored in a memory; and an estimation of downlink bandwidth obtained through measurement of network traffic.

The invention also proposes a device for reception of digital audio/video, the device comprising means to determine a bit rate of a first received audio/video stream, means to determine a bit rate of a second audio/video stream to be received, means to determine if a sum of a first bit rate of the first audio/video stream and of a second bit rate of the second audio/video stream is below a determined threshold, means to sequence a sending of a request to stop receiving the first audio/video stream and a sending of a request to start receiving said second audio/video stream so that if the sum is below the determined threshold, the request to stop receiving the first audio/video stream is sent after the request to start receiving the second audio/video stream and that if the sum is not below the determined threshold, the request to the network to stop receiving the first audio/video stream is sent before the request to start receiving the second audio/video stream.

According to a variant embodiment of the invention, the means to determine a bit rate of a first received audio/video stream, the means to determine a bit rate of a second audio/video stream to be received, and the means to determine if a sum of a first bit rate of the first audio/video stream and of a second bit rate of the second audio/video stream is below a determined threshold, are implemented by a processing unit.

According to a variant embodiment of the invention, the means to sequence a sending of a request to the network to stop receiving the first audio/video stream and a sending of a request to the network to start receiving said second audio/video stream is implemented by a scheduler.

According to a variant of the device for reception of digital audio/video, the device is a mobile terminal.

According to a variant of the device for reception of digital audio/video, the device is a Set Top Box receiver for reception of digital audio/video streams.

According to a variant of the device for reception of digital audio/video, the device is a digital television set with integrated receiver for reception of digital audio/video streams.

4. LIST OF FIGURES

More advantages of the invention will appear through the description of particular, non-restricting embodiments of the invention. The embodiments will be described with reference to the following figures:

FIG. 5 shows a sequence diagram of actions that are performed on channel change according to prior art;

FIG. 6 shows a sequence diagram of actions that are performed on channel change according to a particular embodiment of the invention, implemented for example by the receiver device of FIG. 1.

5. DETAILED DESCRIPTION OF THE INVENTION

Figure 1:
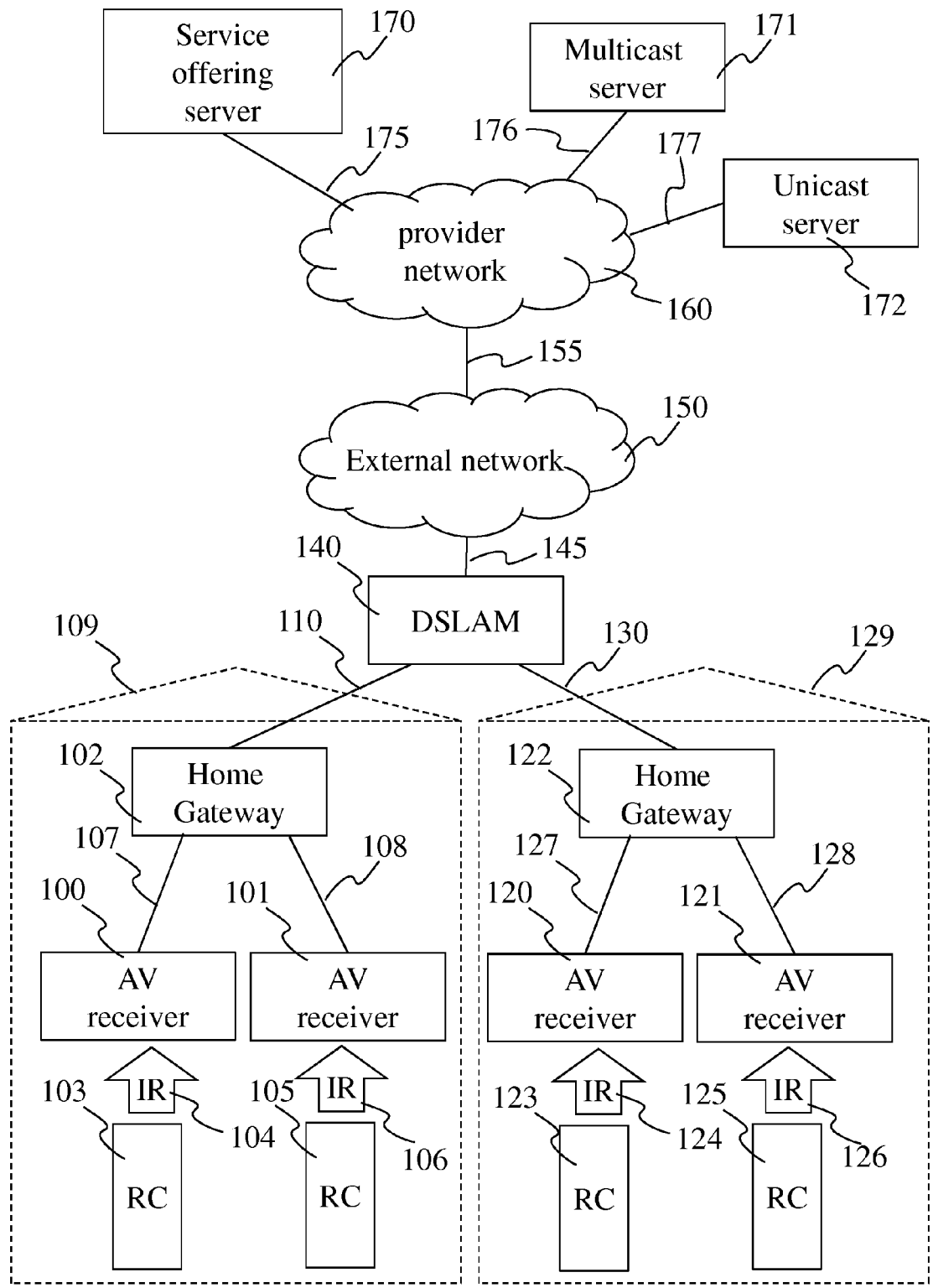
FIG. 1 shows an example digital audio/video receiver device according to a particular embodiment of the invention, in a network.

FIG. 1 shows an example digital audio/video receiver device according to a particular embodiment of the invention, in a network.

A user premise 109 comprises a home gateway 102, two AV receivers 100 and 101 equipped with remote controls 103 and respectively 105. The Remote controls 103 and 105 allow a user to transmit channel change commands to respectively AV receivers 100 and 101, using infra-red light emission 104 respectively 106. AV receivers 100 and 101 are connected to a home gateway 102 by means of connections 107 respectively 108, which gives the AV receivers 100 and 101 access to the external network 150, a digital packet transport network, via a connection 110 to DSLAM 140. A Digital Subscriber Line Access Multiplexer or DSLAM is a device that takes a number of DSL subscriber lines and concentrates these onto a single Asynchronous Transfer Mode (ATM) line. Likewise, user premises 129 comprises home gateway 122, AV receivers 120 and 121, and remote controls 123 and 125 which command respectively AV receiver 120 and AV receiver 121, via IR emissions 124, respectively 126. AV receivers 120 and 121 are connected to home gateway 122 via respectively connections 127 and 128, and home gateway 122 is connected to DSLAM 140 via connection 130. DSLAM 140 is connected to external network 150 via connection 145. External network 150 is connected to a provider network 160 via connection 155. Provider network 160 comprises a service offering server 170, a multicast server 171 and a unicast server 172 connected to the provider network 160 via respectively connections 175, 176 and 177.

A possibly usage scenario is given hereafter. Upon powering up of AV receiver 100, the AV receiver 100 initiates a communication with service offering server 170 in order to download a list of available services. Then AV receiver 100 connects to the last service previously received when the AV receiver 100 was put into standby, through issuing a request to receive a particular AV stream from one of the servers 171 or 172. Upon receipt of AV stream from one of these servers, the AV receiver decodes and renders the data comprised in the received AV stream. When the user of AV receiver 100 wants to change channel, he presses the appropriate button (for example P+) on remote control 103. AV receiver 100 then sends a request to stop reception of the currently received AV stream to DSLAM 140, followed by a request to receive the desired AV stream. When data is received, it is decoded and rendered by AV receiver 100.

Depending on whether a received or a requested AV stream is of unicast or multicast nature, 140 respectively transmits or does not transmit the requests from AV receiver 100 to equipment in the provider network 160. For multicast streams, no communication is necessary since the DSLAM 140 receives all multicast streams and merely puts them through on request; for unicast streams, the communication between AV receiver 100 and unicast server 172 is put through.

The functioning is similar for AV receivers 101, 120 and 121.

According to an embodiment of the invention, the AV streams received by AV receiver 100 originate from different networks, such as from from a mobile telephone network and from an IP network.

Figure 2:
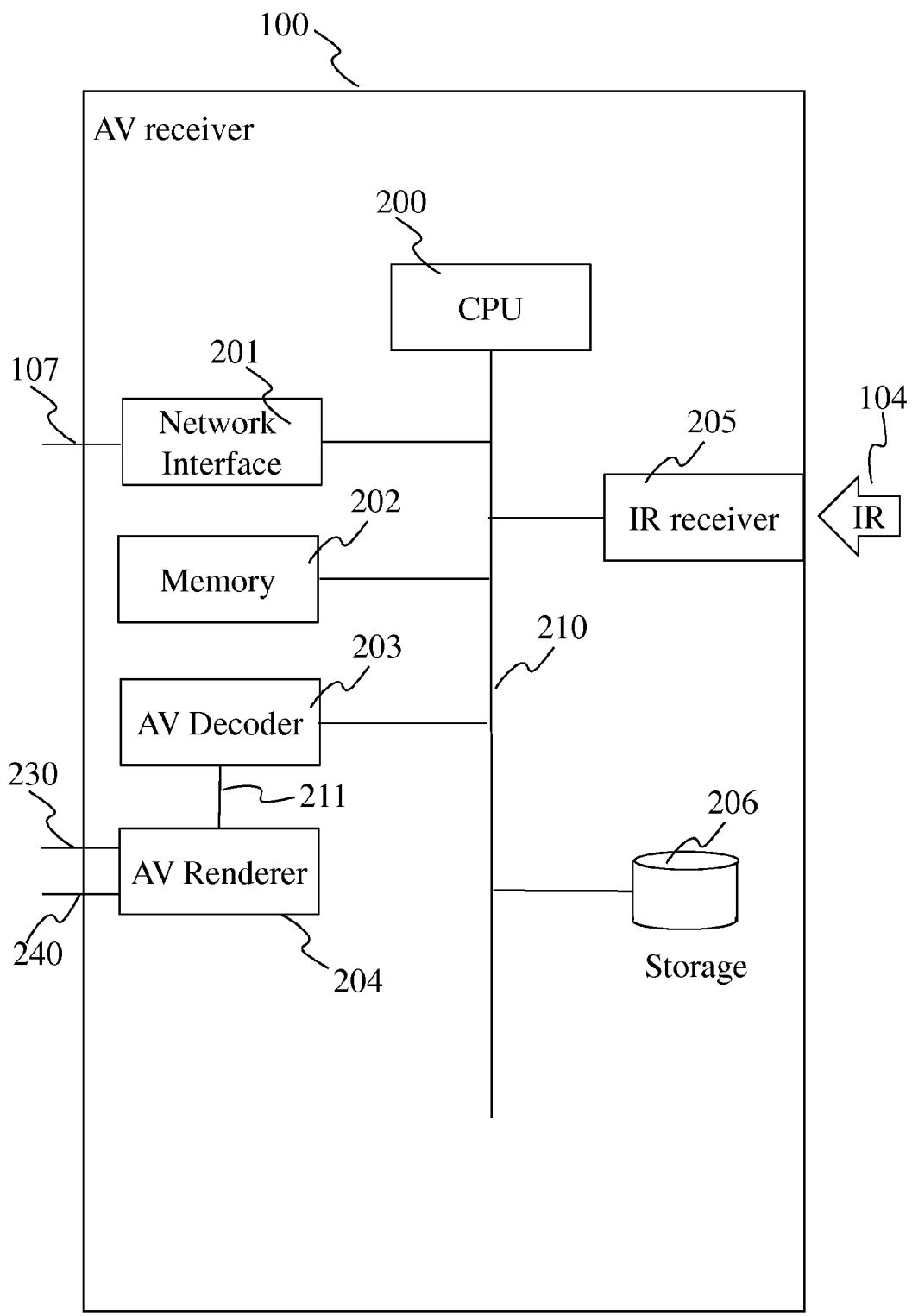
FIG. 2 shows an example digital audio/video receiver device, such as receiver device of FIG. 1, according to a particular embodiment of the invention.

FIG. 2 shows an example digital audio/video receiver device according to a particular embodiment of the invention.

The digital audio/video receiver device 100 comprises the following elements:
- central processing unit or CPU 200;
- a network interface 201;
- a memory 202;
- an audio/video decoder 203;
- an audio/video renderer 204;
- an infrared receiver 205; and
- a storage device 206.

CPU 200, network interface 201, memory 202, AV decoder 203, IR receiver 205 and storage device 206 are interconnected through a digital data communication bus 210. AV renderer 204 is connected to AV Decoder via link 211. The AV receiver device 100 is connected with its environment via link 107, connecting the device's network interface 201 to an external digital data communication network, IR link 104, connecting the device's IR receiver 205 to an infrared remote control, link 230, being connected to the audio output of AV renderer 204, and link 240, being connected to the video output of AV renderer 204. In device 100, CPU 200 manages the functioning of the device, allowing, via network interface 201, reception of digital AV streams from the digital communication network 150/DSLAM 140, and allowing the device 100, again via network interface 201, to send request for sending or for stopping to send AV streams to digital packet communication network 150/DSLAM 140; allowing to store data in memory 202, allowing to decode AV data through AV decoder 203; allowing to render data through AV renderer 204, allowing to receive user input via IR receiver 205, such as channel change commands, and allowing time-shift via storage device 206.

Figure 3:
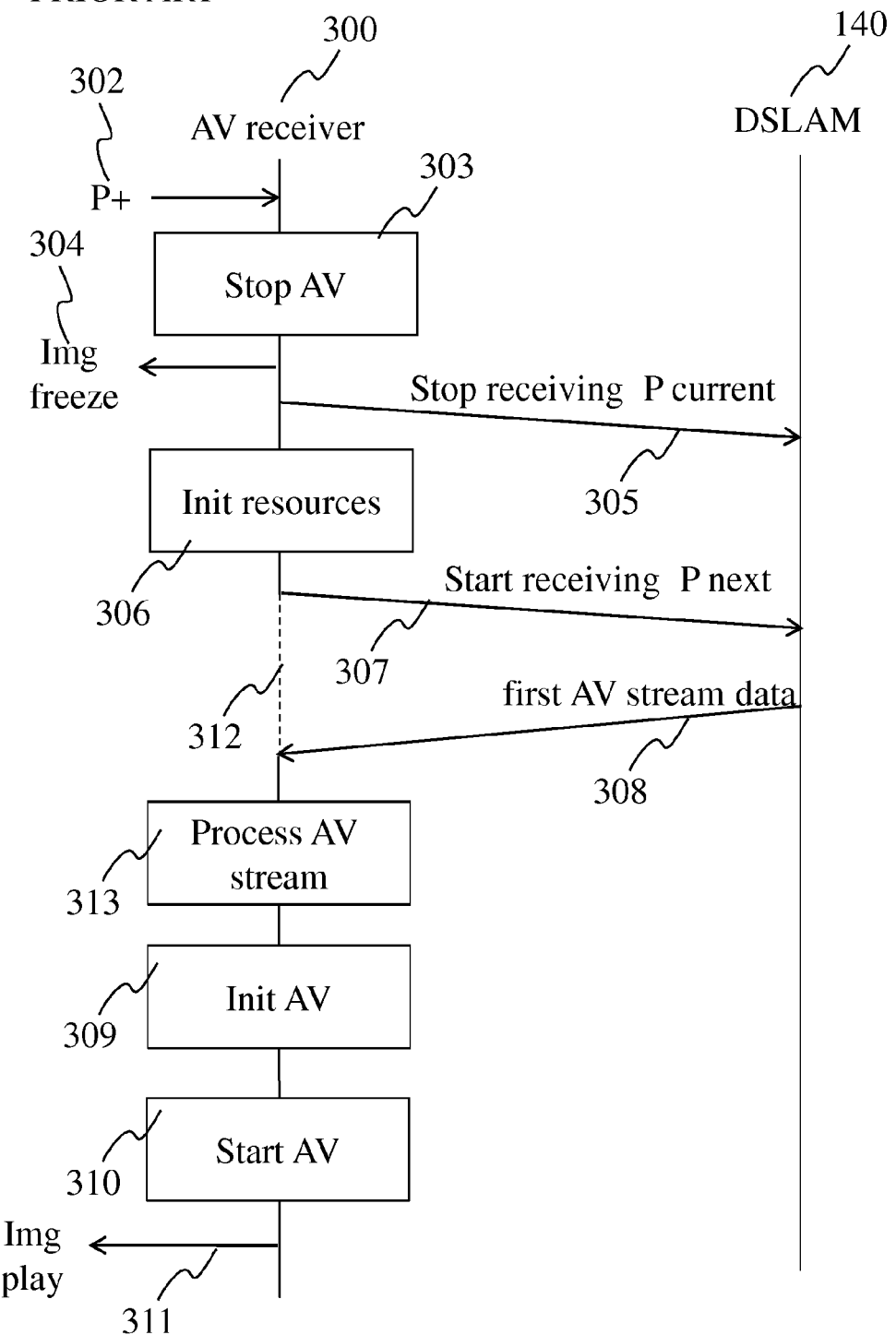
FIG. 3 shows a flow chart illustrating channel change according to prior-art.

FIG. 3 shows a flow chart illustrating the process of channel change implemented by a digital AV receiver device according to prior-art.

Illustrated is a vertical timeline representing a prior-art digital AV receiver 300 and a DSLAM 140.

When a user presses P+ (forward channel change) on his remote control, a channel change command is received, illustrated by arrow 302. Upon reception of this command, the AV receiver's 300 decoder is stopped in a step 303. This results in a black screen or an image freeze, illustrated by arrow 304. After having stopped the AV receiver's 300 AV decoder, the AV receiver 300 sends a request to stop receiving the current received AV stream, which is illustrated by arrow 305, from AV receiver 300 to DSLAM 140. After this, in a step 306, the AV receiver 300 initializes its resources, meaning, for example, de-allocation of memory buffers, closing time-shift recording, closing of descrambling module, followed by allocation of memory buffers, reinitialization of time-shift recording, and reinitialization of scrambling module. When all resources are initialized, the AV receiver 300 is ready to issue a request for reception of the AV stream corresponding to the next channel, which is illustrated by arrow 307 from AV receiver 300 to DSLAM 140. Dotted line 312 between step 306 and step 309 illustrate time that is spent in waiting for reception of first data from the new AV stream. When the first data from the AV stream is received, illustrated by arrow 308 from DSLAM 140 to AV receiver 300, the AV stream is processed in a step 313 in order to, for example, wait for, extract and process tables giving information on the components of the stream, for example audio/video, subtitles, interactive applications, these tables giving information on the packet identifiers (PIDs) of other tables or other components, access control processing for descrambling, waiting for a beginning of a GOP to be able to start decoding, and waiting for synchronization between audio and video components of the stream. Then, AV receiver 300 initializes the AV receiver's 300 AV decoder, illustrated by step 309; initializing the AV decoder comprises for example providing it with the program identifiers (PIDs) of the desired audio and video components of the AV stream. Finally, AV receiver 300 starts the AV decoder in a step 310 and after a short delay the first image frame/audio frame is rendered, which is illustrated by arrow 311.

Figure 4:
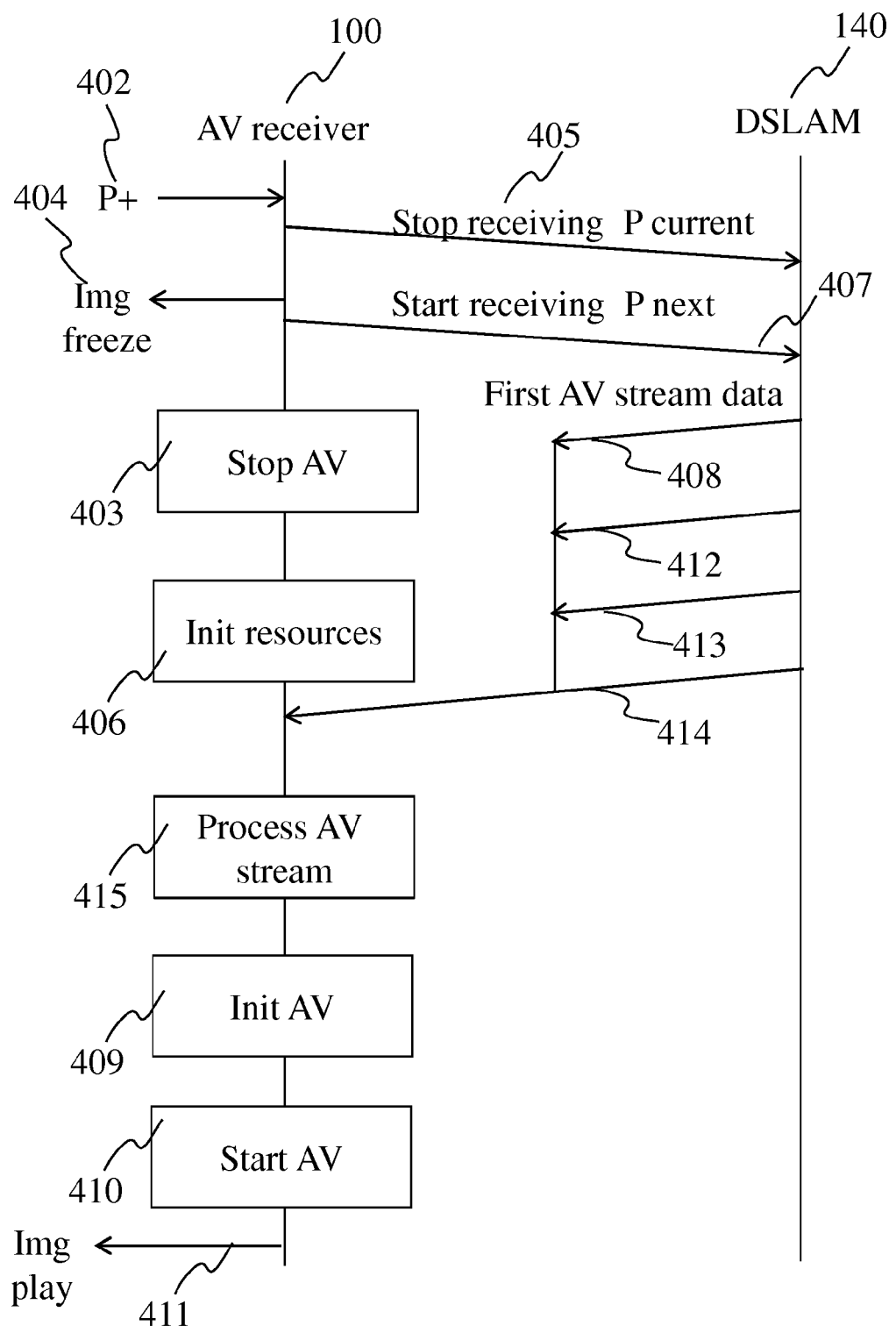
FIG. 4 shows a flow chart illustrating channel change according to a particular embodiment of the invention, implemented for example by the receiver device of FIG. 1.

FIG. 4 shows a flow chart illustrating channel change according to a particular embodiment of the invention, implemented for example by digital AV receiver device 100 of FIGS. 1 and 2.

The diagram illustrates two vertical time lines, one marked with the number 100 representing the AV receiver according to a particular embodiment of the invention, the other representing DSLAM 140.

The flow chart starts with the reception by digital AV receiver device 100 of a channel change command, illustrated by arrow 402. Upon receipt of this command, the AV receiver 100 sends a request to DSLAM 140, using network interface 201, to stop receiving a currently received AV stream, which is illustrated by arrow 405 from AV receiver 100 to DSLAM 140. Shortly afterwards, reception of AV stream will stop, and the lack of data to decode will result in a black screen or an image freeze, which is illustrated by arrow 404. Upon having sent the request to stop receiving data from the currently received AV stream, the device 100 sends a request to start receiving the next AV stream, illustrated by arrow 407 from AV receiver 100 to DSLAM 140. Then AV receiver 100 stops AV decoder 203 in a step 403. Stopping the AV decoder comprise the writing of a specific stop command to an AV decoder implemented in a dedicated hardware circuit. According to a variant embodiment, stopping the AV decoder comprise the writing of a specific stop command to an AV decoder implemented as a process. According to yet another variant embodiment, stopping the AV decoder comprises the toggle of an enable/disable signal of a dedicated AV decoder hardware circuit. According to another variant embodiment, stopping the AV decoder comprises the stop of provision of a clock signal provided to a dedicated AV decoder hardware circuit. Next, in a step 406, AV receiver's 100 resources are initialized. Initialization of resources comprises, for example, de-allocation of memory buffers allocated in memory 202, closing time-shift recording on storage device 206, closing of descrambling module, followed by allocation of memory buffers in buffer 202, reinitialization of time-shift recording on storage device 206, and reinitialization of scrambling module. When all resources are initialized, the AV receiver 100 is immediately ready to process the AV stream in a step 415; there is no wait for data time as in prior art FIG. 3 element 312. The AV stream is processed in step 415 in order to, for example, wait for, extract and process tables giving information on the components of the stream, for example audio/video, subtitles, interactive applications, these tables giving information on the packet identifiers (PIDs) of other tables or other components, access control processing for descrambling, waiting for a beginning of a GOP to be able to start decoding, and waiting for synchronization between audio and video components of the stream. Then AV decoder 203 is initialized, which is illustrated by step 409. Initializing the AV decoder 203 comprises for example providing it with program identifiers (PIDs) of the desired audio and video components of the AV stream. Finally, AV receiver 100 starts AV decoder 203 in a step 410 and after a short delay the first image frame/audio frame is rendered by AV renderer 204, which is illustrated by arrow 411. Starting the AV decoder comprises the writing of a specific start command to an AV decoder implemented in a dedicated hardware circuit. According to a variant embodiment, starting the AV decoder comprise the writing of a specific start command to an AV decoder implemented as a process. According to yet another variant embodiment, starting the AV decoder comprises the toggle of an enable/disable signal of a dedicated AV decoder hardware circuit. According to another variant embodiment, starting the AV decoder comprises a provision of a clock signal to a dedicated AV decoder hardware circuit. In contrast with the prior art channel change process, these is no time spent in waiting for AV stream data to arrive between the init resources step 406 and init AV step 410 because data from the desired AV stream is already received, the request to receive the AV stream having been sent at the very beginning of the channel change process; the early reception of AV data from the desired stream is illustrated by arrows 408, 412 and 413 from DSLAM 140, which data is not taken into account by AV receiver 100 until it is ready to receive the data after step 406, which is illustrated by arrow 414 from DSLAM 140 to AV receiver 100. Because of this absence of waiting for data, the channel change process is faster than prior art.

According to a variant embodiment of the invention, the early data 408, 412 and 413 being received just after having issued request 407 to receive the desired AV stream, is not lost but instead is stored in a data buffer inside memory 202. This variant embodiment allows to further accelerate the channel change process due to the higher probability that the data buffer already contains the data needed for the AV decoder 203 to start decoding, that is, for example: ECM words needed for descrambling, tables describing the PIDs of the stream component, I-frames, and enough data to be able to not loose time by waiting for having enough data to synchronize an audio component inside the received AV stream with a video component inside the received AV stream. The process of channel change according to prior art and according to a particular embodiment of the invention is further compared in FIGS. 5 and 6.

FIG. 5 shows a sequence diagram of actions that are performed on channel change according to prior art. The illustrated sequencing of actions performed on a channel change is exemplary for prior-art channel changing, implemented for example by AV receiver 300 of FIG. 3.

Time line 500 shows actions that are performed sequentially on an imaginary time line that flows from left to right, each action taking a specific delay. Time line 520 shows the reception (530, 532) or not (531) of AV stream data.

The diagram starts with the reception of a channel change command, illustrated by arrow 501. The prior art AV receiver 300 then stops the receiver's AV decoder, illustrated by action 'Stop AV' 510. This action corresponds to step 303 of FIG. 3. The 'Stop AV' action 510 results in a black screen or an image freeze, illustrated by arrow 502. This is followed by the sending of a request to stop receiving the currently received stream, illustrated by action 'Leave' 511. This action corresponds to arrow 305 of FIG. 3. Time line 520 shows that data from an AV stream is received until shortly after action 'Leave' 511 is performed, which is illustrated by arrow 521 showing the consequence of the 'Leave' action 511 on the data reception. Then, action 'Init resources' 512 is performed, which corresponds to step 306 of FIG. 3. Next, action 'Join' is performed, which corresponds to arrow 307 of FIG. 3. Then action 'Wait for data' is performed in which time is spent in waiting from the first data to arrive from the AV stream for which the 'Join' action was done. This 'Wait for data' action corresponds to delay 312 of FIG. 3. Arrow 522 shows the consequence of 'Join' action 513 on the flow of AV data stream, where some time is needed for the first AV stream data to arrive. When data finally arrives, 'Data handling' step 515 is performed, which corresponds to step 313 of FIG. 3. Then, 'Init AV' step 516 is performed, corresponding to step 309 of FIG. 3. Finally, 'Start AV' action 517 is performed, corresponding to step 310 of FIG. 3, resulting in rendering of the first image/audio from the received AV stream, illustrated by arrow 503 and corresponding to arrow 311 of FIG. 3.

FIG. 6 shows a sequence diagram of actions that are performed on channel change according to a particular embodiment of the invention, implemented for example by device 100 of FIG. 1. The figure is illustrated in a similar way as FIG. 5, which allows comparing them.

Time line 650 comprises sequential actions 'Leave' 660, 'Join' 661, 'Stop AV' 662, 'Init resources' 663, 'Data handling' 664, 'Init AV' 665 and 'Start AV' 665. These actions correspond respectively to arrows 405 and 407, steps 403, 406, 415, 409 and 410 of FIG. 4. Arrows 'P+' 651, 652 and 'P+ play' 653 illustrate respectively reception of channel change command, stopping of rendering data from the current channel, and starting rendering data from the next channel. These arrows correspond respectively to arrows 402, 404 and 411 of FIG. 4. Arrows 671 and 672 illustrate respectively the consequence of 'Leave' action 660 and 'Join' action 661 on the AV data stream flow 670. Time line 670 illustrates reception (680, 682) or not (681) of AV stream data.

Unlike with prior art channel change process illustrated by FIGS. 3 and 5, there is no more time spent in a 'Wait for data' step (312 of FIGS. 3 and 514 of FIG. 5); when the 'Init resources' action 663 is performed, 'Data handling' 664 can immediately start because data from the new AV data stream is already being received. This results in shorter channel change time, which is illustrated by arrow 'dT' 640, for delta-T.

For the skilled in the art, the solution of the invention to the problem of reducing the channel change time is rather against his prejudice, because he would naturally be oriented to a solution of reducing the delay of some or all individual steps, and it would be counterintuitive for him to modify the natural sequence of the steps involved in a channel change, as illustrated by FIG. 5, into the sequence of the steps as illustrated for a particular embodiment of the invention by FIG. 6.

Figure 7:
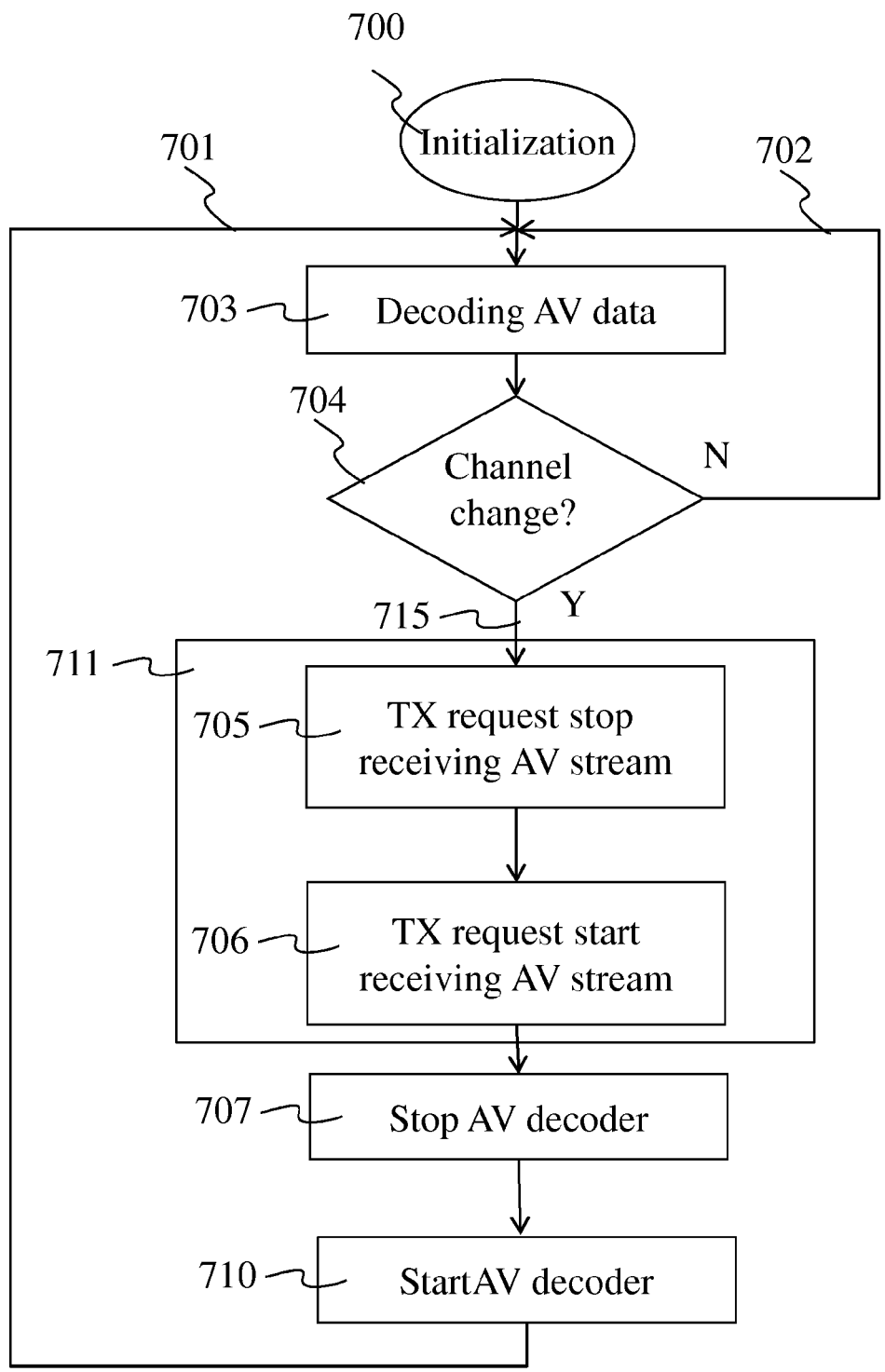
FIG. 7 shows an algorithm of channel change, implemented for example by the receiver device of FIG. 1 according to a particular embodiment of the invention.

FIG. 7 shows an algorithm of channel change, implemented for example by device 100 of FIG. 1 according to a particular embodiment of the invention.

The algorithm starts with a step 700 of allocation and initialization of variables needed for its execution. Then, in a step 703, AV stream data is decoded from a first AV stream, received by means of network interface 201, decoded using AV decoder 203, and rendered by means of AV renderer 204 of FIG. 2. While AV stream data is continues to be decoded and rendered by AV renderer 204, a test step 704 is executed, where it is verified if a channel change request is received, such as 'P+' request 402 of FIG. 4 or 'P+' request 651 of FIG. 6 that is received via IR receiver 205 of FIG. 2. On the negative, step 703 of reiterated and decoding of the current received AV stream continues as it was not interrupted. On the affirmative, a request is sent that comprises a request to stop receiving the first AV stream (step 705) and a request to start receiving the second AV stream (step 706), corresponding to arrows 405 of FIG. 4 and to action 'Leave' 660 of FIG. 6, respectively to arrow 407 of FIG. 4 and to action 'Join' 661 of FIG. 6. In a next step 707, AV decoder 203 is stopped, corresponding to step 403 of FIG. 4 and to action 662 of FIG. 6. In a last step 710, AV decoder 203 of FIG. 2 is started, corresponding to step 410 of FIG. 4 and to action 666 of FIG. 6, and shortly afterwards the first image frame and/or audio frame of the desired AV stream is rendered by AV renderer 204 of FIG. 2, which corresponds to arrows 411 of FIG. 4 and to arrow 653 of FIG. 6, and step 703 is reiterated where decoding continues until a next channel change is received.

In an alternative embodiment of the invention, step 705 of sending a request to stop sending the first AV stream and step 706 of sending a request to start sending the second AV stream are inversed, that is, the disconnection to the first stream is done after the connection to the second stream. This allows to 'push back' the connection to the second stream as close to the reception of the channel change as possible, the connection to the second stream thus immediately following the channel change request, which increases the probability that data is received from the second stream when the receiver 100 is ready to handle the data. However, this can result, in a simultaneous transmission of two AV streams on the downlink from the network to the receiver, and thus is only possible if there is enough bandwidth available on the downlink to support the simultaneous transmission.

In an advanced optimized embodiment of the above variant embodiment, the receiver determines, before inversion or not of the request to stop sending the first AV stream and the request to start sending the second AV stream, if the sum of the bit rates of the first and the second AV streams is below a determined threshold. If the sum of the bit rates is below the determined threshold, the request to stop sending the first AV stream is sent after the request to start sending the second AV stream, thereby allowing early reception of data from the second AV stream. If however the sum of the bit rates is not below the determined threshold, the request to stop sending the first AV stream is sent before the request to start sending the second AV stream, thereby avoiding simultaneous transmission of the first and the second AV streams over the network, and thereby avoiding degradation of the second AV stream due to an exceeding of the available downlink bandwidth. According to a variant embodiment, the determined threshold is configuration data that is present in the receiver's memory as a preconfigured downlink bandwidth value. This feature has the advantage that the threshold is rather easy to determine, since no calculations are needed, and the value can be sufficiently precise in an environment where bandwidth does not change often. The configuration data can be refreshed by a server at regular intervals, or when the downlink characteristics change. According to a variant embodiment, the determined threshold is obtained from an estimation of downlink bandwidth that is done before channel change through measurement of network traffic. This feature is advantageous in environments where the downlink is used for other traffic and this available bandwidth for the reception of the AV streams is thus subject to the intensity of the network traffic at the instant of the channel change. According to a specific embodiment, the features of preconfigured downlink bandwidth and estimation of downlink bandwidth obtained through measurement of network traffic are combined so as to implement a specific advantageous embodiment, allowing for example using the preconfigured downlink bandwidth for a start when an estimation is not possible or too time-consuming, and using the estimation of downlink bandwidth obtained through measurement once the measurements have been done. According to an embodiment, the information on the bit rates of said first and said second AV streams is included in a service list that is received by the receiver 100. According to a variant embodiment, the bit rate values are obtained from previous measurements that the receiver has done on the bit rate of the streams that it received. In certain environments, the bit rate of the streams that a receiver can receive varies little since the transmission of the streams is in constant bit rate. Then this feature has the advantage to allow a good estimation of the value of the bit rates that a receiver can expect. In a still more advanced embodiment, the receiver can request, before the channel change, other processes requiring bandwidth in during the period of simultaneous reception to reduce, suspend or abort their downlink use, thereby increasing available bandwidth and thus increasing the threshold level. In a variant embodiment, both features are combined to give the specific advantage of confronting the measurements with the received bit rate values from the server, and pick the highest value to be sure to have a security margin, which can be useful when the bit rate values sent by the server are out-of-date.

In an alternative embodiment of the invention, steps 705 and 706 are combined in step 711 of transmission of a single request, without intermediate transmission of other data or request(s), for stopping the sending of the first AV stream and starting the sending of the second AV stream. This has the advantage to allow very fast transmission of these request without any intermediate waiting for completion of each individual request, waiting that is typically unnecessary when the receiver changes channel between two multicast AV streams using the IGMP protocol, because the IGMP protocol does not confirm the requests anyway.

The network described in FIG. 1 is a mere example network in which the invention can be used. Other network configurations are possible while remaining compatible with the invention, comprising for example more than two user premises, with each one or more AV receivers, with- or without home gateway (in the case of a single AV receiver). The architecture of the external network, in FIG. 1 represented with a DSLAM, a network 150, a provider network 160, and a service offering server, multi- and unicast servers connected to the provider may also be composed differently, according to the number of subscribers, the type of AV receivers used, the communication protocols used and the equipment needed to provide a service offering.

AV receiver 100 is represented in FIG. 1 as a Set Top Box—like device; however implementation of the invention is not limited to Set Top Boxes, other type of devices are compatible with the invention, such as a Personal Computer, an AV receiver integrated in a TV set, or a wired- or wireless multimedia receiver, or a handheld wireless transmitter/ receiver device such as a mobile terminal.

The embodiments described are illustrated with 'Leave' and 'Join' actions to respectively send a request to stop receiving an AV stream and respectively to send a request to start receiving an AV stream. The wording 'Leave' and 'Join' is related to the Internet Group Management Protocol (IGMP), which is related to reception of multicast streams. The reader of the present document will understand that the invention also applies to other protocols, such as the Real-Time Streaming Protocol (RTSP), used for unicast transmissions. As disconnecting from and connecting to a unicast stream is much more time consuming than disconnecting from and connecting to a multicast stream, the invention allows to accelerate even further the channel change time in an environment where unicast transmission is used for transmission of AV streams, because of the early connection to the new AV stream it is likelier than with prior art that AV stream data will be ready to be processed when the AV receiver is ready to handle the new AV stream data.

Likewise, for illustration purposes the invention is illustrated for a P+ (next) channel change, but the invention also applies to a P− (previous) channel change, or to any other type of channel change (P+10, P−10, etc).

Other types of AV receivers than illustrated by FIG. 2 are possible while being compatible with the invention, such as an AV receiver device with multiple dedicated processing units, multiple digital data communication buses, without IR receiver, without storage device, equipped with one or more access control modules (CA). The invention may be completely built from software components running on a general-purpose device such as a Personal Computer, and the invention can then be implemented in an AV receiver/renderer on a web page, or the invention can be implemented using a mix of hard-and software components. According to a particular embodiment, the invention is entirely implemented in hardware, for example as a dedicated component (for example as an ASIC, FPGA or VLSI) (respectively <<Application Specific Integrated Circuit>>, <<Field-Programmable Gate Array>> and <<Very Large Scale Integration>>) or as distinct electronic components integrated in a device or in a form of a mix of hardware and software.

The invention can be applied to any type of digital AV receiver that changes channels by sending a request to stop of receiving of a currently received AV stream and by sending a request to start of receiving of a desired AV stream to one or more devices providing AV streams. Typically, types of digital AV receivers that are suited to implement the invention are IPTV receivers or Digital Video Broadcasting-Handheld (DVB-H) receivers.

The invention claimed is:

1. A method of reducing digital audio/video channel change delay in a digital audio/video receiver device connected to a network comprising an audio/video stream server, the method being implemented by said digital audio/video receiver device, said method comprising:
    detecting a user request to change from a current channel to a next channel;
    following said detecting a user request to change from a current channel to a next channel and before sending over said network a request to said audio/video stream server to start receiving from said audio/video stream server a second audio/video stream from the next channel, sending over said network a request to said audio/video stream server to stop receiving from said audio/video stream server a first audio/video stream from the current channel;
    following said sending over said network a request to said audio/video stream server to stop receiving from said audio/video stream server a first audio/video stream from the current channel, sending over said network a request to said audio/video stream server to start receiving from said audio/video stream server a second audio/video stream from the next channel;
    following said sending over said network a request to said audio/video stream server to start receiving from said audio/video stream server a second audio/video stream from the next channel, receiving, from said audio/video stream server, second audio/video data comprised in said second audio/video stream from said next channel;
    storing of said received second audio/video data in a memory;
    stopping an audio/video decoder of said digital audio/video receiver from decoding first audio/video data from the current channel, after sending over said network the request to said audio/video stream server to stop receiving from said audio/video stream server said first audio/video data from the current channel and after sending over said network the request to said audio/video stream server to start receiving, from said audio/video stream server, second audio/video data from the next channel;
    reinitializing resources of the digital audio/video receiver for processing the second audio/video data, after sending over said network the request to said audio/video stream server to stop receiving from said audio/video stream server said first audio/video data from the current channel and after sending over said network the request to said audio/video stream server to start receiving, from said audio/video stream server, second audio/video data from the next channel; and
    starting said audio/video decoder of said digital audio/video receiver to decode said received second audio/video data stored in said memory.

2. The method according to claim 1, further comprising determining if a sum of a first bit rate of the first audio/video stream and of a second bit rate of the second audio/video stream is below a downlink bandwidth for transmission of audio/video streams to the digital audio/video receiver device, and
    if the sum is below the downlink bandwidth, the request sent to said audio/video stream server to stop receiving from said audio/video stream server the first audio/video stream is sent after the request sent to said audio/video stream server to start receiving from said audio/video stream server the second audio/video stream, whereas
    if the sum is not below the downlink bandwidth, the request sent to said audio/video stream server to stop receiving from said audio/video stream server the first audio/video stream is sent to said audio/video stream server before the request to start receiving the second audio/video stream is sent to the audio/video stream server.

3. The method according to claim 2, wherein the bit rate of the first audio/video stream from the current channel and/or the bit rate of the second audio/video stream from the next channel is determined through:
    bit rate values obtained from measurements done by a device implementing the method on bit rates of the first audio/video stream from the current channel and/or the second audio/video stream from the next channel during previous reception of the streams; and/or
    bit rate values of the first audio/video stream from the current channel and the second audio/video stream from the next channel received from a server connected to the device.

4. The method according to claim 2, wherein the downlink bandwidth is obtained from:
a preconfigured downlink bandwidth stored in a memory; and/or
an estimation of downlink bandwidth obtained through measurement of network traffic.

5. The method according to claim 1, wherein the method further comprises, initializing memory resources for reception of data from the second audio/video stream from the next channel.

6. A device for reception of digital audio/video, the device being configured to be connected to a network comprising an audio/video stream server, the device comprising:
a memory;
a processor coupled to the memory, the processor being configured to:
determine a bit rate of a first received audio/video stream from a current channel;
determine a bit rate of a second audio/video stream to be received from a next channel;
determine if a sum of a first bit rate of the first audio/video stream from the current channel and of a second bit rate of the second audio/video stream from the next channel is below a downlink bandwidth for transmission of audio/video streams to the device;
if the sum is below the downlink bandwidth, send over said network a request to stop receiving from said audio/video stream server the first audio/video stream from the current channel after sending over the network a request to said audio/video stream server to start receiving from said audio/video stream server the second audio/video stream from the next channel; and
if the sum is not below the downlink bandwidth, send over said network the request to said audio/video stream server to stop receiving from said audio/video stream server the first audio/video stream from the current channel before sending over the network the request to the audio/video stream server to start receiving from said audio/video stream server the second audio/video stream from the next channel.

7. The device according to claim 6, wherein the device is a mobile terminal.

8. The device according to claim 6, wherein the device is a Set Top Box receiver for reception of digital audio/video streams.

9. The device according to claim 6, wherein the device is a digital television set with an integrated receiver for reception of digital audio/video streams.

10. A Set Top Box device for reception of digital audio/video streams from an audio/video stream server connected to said Set Top Box via a network, said Set Top Box device comprising:
an integrated receiver for reception of digital audio/video streams from said audio/video stream server; and
integrated circuitry configured to:
determine a bit rate of a first received digital audio/video stream from a current channel;
determine a bit rate of a second digital audio/video stream to be received from a next channel;
determine if a sum of a first bit rate of the first audio/video stream from the current channel and of a second bit rate of the second audio/video stream from the next channel is below a downlink bandwidth for transmission of audio/video streams to the device; and
when the sum is below the downlink bandwidth, transmit over said network a request to said audio/video stream server to stop receiving from said audio/video stream server the first audio/video stream from the current channel after sending over said network a request to said audio/video stream server to start receiving from said audio/video stream server the second audio/video stream from the next channel; and
when the sum is not below the downlink bandwidth, transmit over the network the request to said audio/video stream server to stop receiving from the audio/video stream server the first audio/video stream from the current channel before sending over the network the request to the audio/video stream server to start receiving from the audio/video stream server the second audio/video stream from the next channel.

11. The device according to claim 6, wherein the processor is further configured to:
stop an audio/video decoder of the device from decoding the first audio/video stream from the current channel after sending over said network the request to said audio/video stream server to stop receiving from said audio/video stream server the first audio/video stream from said audio/video stream server from the current channel and after sending over said network the request to said audio/video stream server to start receiving from said audio/video stream server the second audio/video stream from the next channel; and
reinitialize resources of a digital audio/video receiver for processing the second audio/video stream from the next channel, after sending over said network the request to said audio/video stream server to stop receiving from said audio/video stream server the first audio/video stream from the current channel and after sending over said network the request to said audio/video stream server to start receiving from said audio/video stream server the second audio/video stream from the next channel.

12. The device according to claim 10, wherein the integrated circuitry is further configured to:
stop an audio/video decoder of the device from decoding the first audio/video stream from the current channel after sending over said network the request to said audio/video stream server to stop receiving the first audio/video stream from the current channel and after sending over said network the request to said audio/video server to start receiving from said audio/video stream server the second audio/video stream from the next channel; and
reinitialize resources of a digital audio/video receiver for processing the second audio/video stream from the next channel, after sending over said network the request to said audio/video stream server to stop receiving the first audio/video stream from the current channel and after sending over said network the request to said audio/video stream server to start receiving from said audio/video stream server the second audio/video stream from the next channel.

13. The device according to claim 10, wherein the bit rate of the first audio/video stream from the current channel and/or the bit rate of the second audio/video stream from the next channel is at least partially based on bit rate values obtained from measurements during previous reception of streams; and/or bit rate values of the first audio/video stream from the current channel and the second audio/video stream from the next channel received from a server connected to the Set Top Box.

14. The device according to claim 10, wherein the downlink bandwidth is obtained from a preconfigured downlink bandwidth stored in a memory; and/or an estimation of downlink bandwidth obtained through measurement of network traffic.

15. The device according to claim 10, wherein the integrated circuitry is further configured to initialize memory resources for reception of data from the second audio/video stream from the next channel.

16. A digital audio/video receiver device, the device being configured to be connected to a network comprising an audio/video stream server, the device comprising:
   a memory;
   an audio/video decoder;
   a central processor coupled to the memory, the central processor being configured to:
   detect a user request to change from a current channel to a next channel;
   send over said network a request to said audio/video stream server to stop receiving from said audio/video stream server a first audio/video stream from the current channel;
   send over said network a request to said audio/video stream server to start receiving from said audio/video stream server a second audio/video stream from the next channel;
   receive, from said audio/video stream server, second audio/video data comprised in said second audio/video stream from said next channel;
   store said second audio/video data in the memory;
   stop said audio/video decoder from decoding first audio/video data from the current channel, after sending over said network the request to the audio/video stream server to stop receiving from the current channel and after sending over said network the request to the audio/video stream server to start receiving from the next channel;
   reinitialize resources of the digital audio/video receiver for processing the second audio/video data, after sending over said network the request to the audio/video stream server to stop receiving from the current channel and after sending over said network the request to the audio/video stream server to start receiving from the next channel; and
   start said audio/video decoder to decode said second audio/video data stored in said memory.

17. The device of claim 16, wherein the central processor is further configured to:
   determine if a sum of a first bit rate of the first audio/video stream from the current channel and of a second bit rate of the second audio/video stream from the next channel is below a downlink bandwidth for transmission of audio/video streams to the device, and
   if the sum is below the downlink bandwidth, send over said network the request to the audio/video stream server to stop receiving from the audio/video stream server the first audio/video stream from the current channel after sending over the network the request to the audio/video stream server to start receiving from the audio/video stream server the second audio/video stream from the next channel; and
   if the sum is not below the downlink bandwidth, send over the network the request to said audio/video stream server to stop receiving from said audio/video stream server the first audio/video stream from the current channel before sending over the network the request to the audio/video stream server to start receiving from the audio/video stream server the second audio/video stream from the next channel.

18. The device of claim 17, wherein the central processor is further configured to determine the bit rate of the first audio/video stream from the current channel and/or the bit rate of the second audio/video stream from the next channel based at least partially on at least one of bit rate values obtained from measurements, bit rates of the first audio/video stream from the current channel and/or the second audio/video stream from the next channel during previous reception of the streams, and bit rate values of the first audio/video stream from the current channel and the second audio/video stream from the next channel received from a server.

19. The device of claim 17, wherein the central processor is further configured to obtain the downlink bandwidth from at least one of a preconfigured downlink bandwidth stored in a memory and an estimation of downlink bandwidth obtained through measurement of network traffic.

20. The device claim 16, wherein the central processor is further configured to initialize memory resources for reception of data from the second audio/video stream from the next channel.

21. A method for reception of digital audio/video from an audio/video stream server, the method being implemented by a digital audio/video receiver device connected to said audio/video stream server via a network, the method comprising:
   determining, using integrated circuitry of a central processor, a bit rate of a first received audio/video stream from a current channel;
   determining, using the central processor, a bit rate of a second audio/video stream to be received from a next channel;
   determining, using the central processor, if a sum of a first bit rate of the first audio/video stream from the current channel and of a second bit rate of the second audio/video stream from the next channel is below a downlink bandwidth for transmission of audio/video streams to the device; and
   when the sum is below the downlink bandwidth, transmitting, over the network and using the central processor, a request to the audio/video stream server to stop receiving from the audio/video stream server the first audio/video stream from the current channel after transmission over the network a request to the audio/video stream server to start receiving from the audio/video stream server the second audio/video stream from the next channel; and
   when the sum is not below the downlink bandwidth, transmitting, over the network and using the central processor, the request to the audio/video stream server to stop receiving from the audio/video stream server the first audio/video stream from the current channel before transmitting the request to the audio/video stream server to start receiving the second audio/video stream from the next channel.

22. The method of claim 21, further comprising:
   stopping an audio/video decoder from decoding the first audio/video stream from the current channel after sending over the network the request to the audio/video stream server to stop receiving from the audio/video stream server the first audio/video stream from the current channel and after sending over the network the request to the audio/video stream server to start receiving from the audio/video stream server the second audio/video stream from the next channel; and reinitializing resources of a digital audio/video receiver for processing the second audio/video stream from the next channel, after sending over the network the request to the audio/video stream server to stop receiving from the audio/video stream server the first audio/video stream from the current channel and after sending over the network the request to the audio/video stream server to start receiving from the audio/video stream server the second audio/video stream from the next channel.

23. The method of claim 21, wherein the bit rate of the first audio/video stream from the current channel and/or the bit rate of the second audio/video stream from the next channel is at least partially based on bit rate values obtained from measurements during previous reception of streams; and/or bit rate values of the first audio/video stream from the current channel and the second audio/video stream from the next channel received from a server.

24. The method of claim 21, further comprising obtaining, using the central processor, the downlink bandwidth from at least one of a preconfigured downlink bandwidth stored in a memory; and/or an estimation of a downlink bandwidth.

25. The method of claim 21, further comprising initializing, using the central processor, memory resources for reception of data from the second audio/video stream from the next channel.

* * * * *